United States Patent [19]

Mäusezahl

[11] Patent Number: 5,094,665
[45] Date of Patent: Mar. 10, 1992

[54] AZO DYE MIXTURE AND THEIR USE FOR DYEING AND PRINTING NATURAL AND SYNTHETIC POLYAMIDES

[75] Inventor: Dieter Mäusezahl, Biel-Benken, Switzerland

[73] Assignee: Ciba-Geigy Corporation, Ardsley, N.Y.

[21] Appl. No.: 599,587

[22] Filed: Oct. 18, 1990

[30] Foreign Application Priority Data

Oct. 23, 1989 [CH] Switzerland ............ 3825/89
Oct. 23, 1989 [CH] Switzerland ............ 3826/89

[51] Int. Cl.⁵ .................. C09B 29/40; C09B 67/22; D06P 3/24
[52] U.S. Cl. .......................... 8/641; 8/639; 8/682; 8/683; 8/687; 8/692; 8/694; 8/917; 8/924
[58] Field of Search .................. 8/641, 639

[56] References Cited

U.S. PATENT DOCUMENTS

| | | | |
|---|---|---|---|
| 4,396,393 | 8/1983 | Schaetzer et al. | 8/643 |
| 4,402,704 | 9/1983 | Raisin et al. | 8/641 |
| 4,445,905 | 5/1984 | Schaetzer et al. | 8/641 |
| 4,537,598 | 8/1985 | Schaetzer et al. | 8/641 |
| 4,652,269 | 3/1987 | Bowles et al. | 8/641 |
| 4,954,563 | 9/1990 | Hurter | 534/783 |

OTHER PUBLICATIONS

The Theory & Practice of Wool Dyeing, the Society of Dyers & Colourists, 1972, p. 79.

Primary Examiner—A. Lionel Clingman
Attorney, Agent, or Firm—George R. Dohmann; Edward McC. Roberts

[57] ABSTRACT

The invention relates to a dye mixture containing a dye of the formula

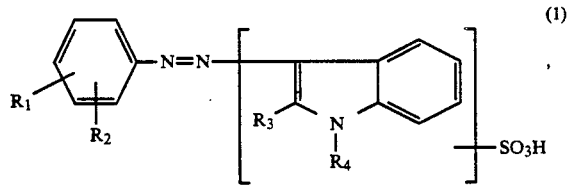

in which $R_1$ is hydrogen, $C_{1-4}$alkyl, $C_{1-4}$alkoxy, halogen, $C_{2-4}$alkanoylamino or an unsubstituted or substituted arylsulfonyl, aryloxy or arylcarbonyl radical, $R_2$ is hydrogen, halogen, an unsubstituted or substituted alkyl, aryloxy or aryloxysulfonyl radical or a radical of the formula

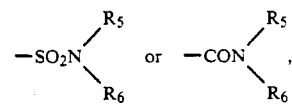

$R_3$ is unsubstituted or substituted alkyl or aryl radical, $R_4$ is hydrogen or alkyl and $R_5$ and $R_6$ independently of one another are hydrogen or an unsubstituted or substituted alkyl, cycloalkyl or aryl radical, and at least one dye of the formula (2) to (5)

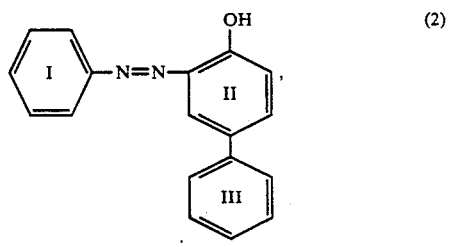

in which the benzene rings I, II and III can be substituted,

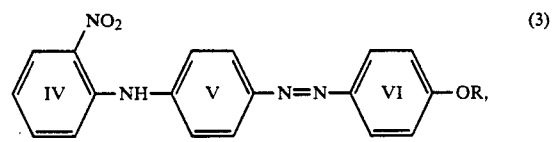

in which the benzene rings IV, V and VI can be substituted and R is hydrogen or arylsulfonyl,

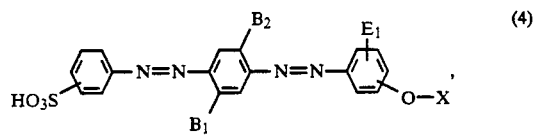

in which $B_1$, $B_2$ and $E_1$ are hydrogen, $C_{1-4}$alkyl, $C_{1-4}$alkoxy or $C_{2-4}$hydroxyalkoxy and X is straight-chain or branched $C_{1-4}$alkyl or straight-chain or branched $C_{2-4}$hydroxyalkyl, and

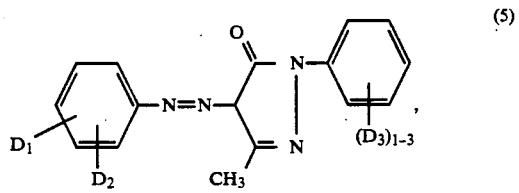

in which $D_1$ is as defined for $R_1$ in formula (1), $D_2$ is as defined for $R_2$ in formula (1) and $(D_3)_{1-3}$ is 1 to 3 substituents $D_3$, and $D_3$ is hydrogen, halogen, $C_{1-4}$alkyl, $C_{1-4}$alkoxy or sulfo.

20 Claims, No Drawings

AZO DYE MIXTURE AND THEIR USE FOR DYEING AND PRINTING NATURAL AND SYNTHETIC POLYAMIDES

The present invention relates to mixtures of yellow-colouring dyes which are suitable for dyeing naturally occurring or synthetic textile polyamide fibre materials from an aqueous bath, have very good fastness properties and exhibit good affinity properties, especially in combination with other dyes and especially from short liquors.

The present invention relates to a dye mixture containing a dye of the formula

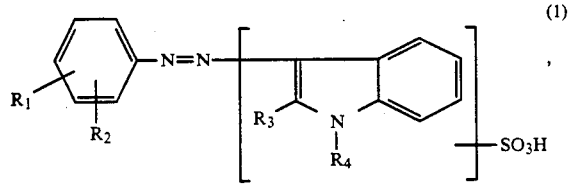

in which $R_1$ is hydrogen, $C_{1-4}$alkyl, $C_{1-4}$alkoxy, halogen, $C_{2-4}$alkanoylamino or an unsubstituted or substituted arylsulfonyl, aryloxy or arylcarbonyl radical, $R_2$ is hydrogen, halogen, an unsubstituted or substituted alkyl, aryloxy or aryloxysulfonyl radical or a radical of the formula

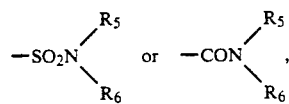

$R_3$ is an unsubstituted or substituted alkyl or aryl radical, $R_4$ is hydrogen or alkyl and $R_5$ and $R_6$ independently of one another are hydrogen or an unsubstituted or substituted alkyl, cycloalkyl or aryl radical, and at least one dye of the formulae (2) to (5)

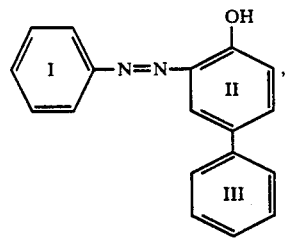

in which the benzene rings I, II and III can be substituted,

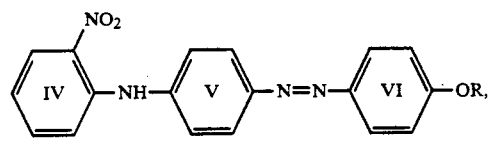

in which the benzene rings IV, V and VI can be substituted and R is hydrogen or arylsulfonyl,

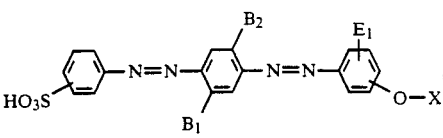

in which $B_1$, $B_2$ and $E_1$ are hydrogen, $C_{1-4}$alkyl, $C_{1-4}$alkoxy or $C_{2-4}$hydroxyalkoxy and X is straight-chain or branched $C_{1-4}$alkyl or straight-chain or branched $C_{2-4}$hydroxyalkyl, and

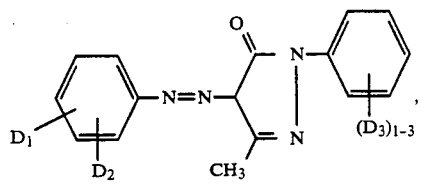

in which $D_1$ is as defined for $R_1$ in formula (1), $D_2$ is as defined for $R_2$ in formula (1) and $(D_3)_{1-3}$ is 1 to 3 substituents $D_3$, and $D_3$ is hydrogen, halogen, $C_{1-4}$alkyl, $C_{1-4}$alkoxy or sulfo.

The dye mixture according to the invention containing a dye of the formula (1) and one or more dyes of the formula (2), or a dye of the formula (1) and one or more dyes of the formula (3), or a dye of the formula (1), one or more dyes of the formula (2) and one or more dyes of the formula (3) is preferred.

The dye mixture according to the invention containing a dye of the formula (1) and one or more dyes of the formula (4), or a dye of the formula (1) and one or more dyes of the formula (5), or a dye of the formula (1), one or more dyes of the formula (4) and one or more dyes of the formula (5) is likewise preferred.

$C_{1-4}$Alkyl $R_1$, $D_1$ or $D_3$ is methyl, ethyl, n-propyl, iso-propyl, n-butyl, sec-butyl, isobutyl or tert-butyl.

$C_{1-4}$Alkoxy $R_1$, $D_1$ or $D_3$ is methoxy, ethoxy, n-propoxy, isopropoxy, n-butoxy, sec-butoxy, isobutoxy or tert-butoxy.

$C_{2-4}$Alkanoylamino $R_1$ or $D_1$ is, for example, acetylamino, propionylamino or butyrylamino.

In an unsubstituted or substituted arylsulfonyl, aryloxy or arylcarbonyl radical $R_1$ or $D_1$, aryl is preferably a radical of the benzene or naphthalene series, which can be further substituted, for example by $C_{1-4}$alkyl groups, such as methyl and ethyl, $C_{1-4}$alkoxy groups, such as methoxy and ethoxy, halogen, such as fluorine, chlorine and bromine, alkanoylamino groups having 1 to 6 carbon atoms, such as acetylamino, and hydroxyl.

Halogen $R_1$, $R_2$, $D_1$, $D_2$ or $D_3$ is fluorine, chlorine or bromine.

In an unsubstituted or substituted aryloxy or aryloxysulfonyl radical $R_2$ or $D_2$, aryl is a radical of the benzene or naphthalene series which can be further substituted, for example by $C_{1-4}$alkyl groups, such as methyl and ethyl, $C_{1-4}$alkoxy groups, such as methoxy and ethoxy, halogen, such as fluorine, chlorine and bromine, alkanoylamino groups having 1 to 6 carbon atoms, such as acetylamino, and hydroxyl.

Unsubstituted or substituted alkyl radicals $R_2$, $R_3$, $R_5$, $R_6$ or $D_2$ are, independently of one another, preferably a straight-chain or branched $C_{1-12}$alkyl, in particular $C_{1-4}$alkyl, radical which can be further substituted, for example by halogen, such as fluorine, chlorine or bromine, hydroxyl, cyano, $C_{1-4}$alkoxy, such as methoxy or ethoxy, and alkanoyl groups having 1 to 6 carbon atoms, such as the acetyl or propionyl group, and the benzoyl group. The alkyl radical $R_3$ can also be substituted by sulfo. Examples of an alkyl radical $R_2$, $R_3$, $R_5$ and $R_6$ are: methyl, ethyl, propyl, isopropyl, butyl, sec-butyl, tert-butyl, isobutyl and trifluoromethyl.

Unsubstituted or substituted aryl radicals $R_3$, $R_5$ and $R_6$ preferably belong, independently of one another, to the benzene or naphthalene series, and can be further substituted, for example by $C_{1-4}$alkyl groups, such as methyl, $C_{1-4}$alkoxy groups, such as methoxy and ethoxy, halogen, such as fluorine, chlorine or bromine, trifluoromethyl, alkanoylamino groups having 1 to 6 carbon atoms, such as acetylamino, hydroxyl and carboxyl. The aryl radical $R_3$ can also be substituted by sulfo. An aryl radical $R_3$, $R_5$ and $R_6$ is, in particular, a phenyl radical, which can be substituted by methyl, trifluoromethyl and chlorine.

An alkyl radical $R_4$ is preferably a straight-chain or branched $C_{1-12}$alkyl, and in particular $C_{1-8}$alkyl, radical. Examples are: methyl, ethyl, propyl, isopropyl, butyl, sec-butyl, tert-butyl, isobutyl, pent-1-yl, pent-3-yl, hept-1-yl, hept-3yl and oct-1-yl.

Unsubstituted or substituted cycloalkyl radicals $R_5$ and $R_6$ are, independently of one another, preferably cycloalkyl groups having 5- to 7-membered rings, which can be further substitued, for example by $C_{1-4}$alkyl, such as methyl. The cyclohexyl groups is particularly suitable.

The substituents of the benzene rings I, II, III, IV, V and VI are, for example, alkyl groups having 1 to 8, preferably 1 to 4, carbon atoms, for example methyl, ethyl, propyl, isopropyl, butyl, isobutyl, sec-butyl, tert-butyl, hexyl and octyl, it being possible for the alkyl groups to be substituted by sulfo or sulfato, alkoxy groups having 1 to 8 carbon atoms, in particular 1 to 4 carbon atoms, for example methoxy, ethoxy, propoxy, isopropoxy and butoxy, it being possible for the alkoxy group in the alkyl radical to be substituted by sulfo or sulfato, acylamino groups, such as alkanoylamino groups having 2 to 8 carbon atoms and alkoxycarbonylamino groups having 2 to 8 carbon atoms, for example acetylamino, propionylamino, methoxycarbonylamino and ethoxycarbonylamino, alkanoyl groups having 2 to 8, preferably 2 to 4, carbon atoms, for example acetyl, propionyl, butyryl or isobutyryl, $C_5$-$C_7$cycloalkylcarbonyl, for example cyclohexylcarbonyl, $C_5$-$C_7$cycloalkylcarbonyl which is substituted in the cycloalkyl ring by $C_1$-$C_4$alkyl, for example methyl, ethyl, propyl or butyl, halogen, for example fluorine, chlorine or bromine, sulfo of sulfato, benzoyl, benzoyl which is substituted in the phenyl ring by $C_1$-$C_4$alkyl, for example methyl, ethyl, propyl or butyl, or halogen, for example fluorine, chlorine or bromine, sulfo or sulfato, benzothiazole or benzoxazole which is unsubstituted or substituted by $C_1$-$C_4$alkyl, halogen, sulfo or sulfato, benzoylamino, amino, mono- or dialkylamino having 1 to 8 carbon atoms in the alkyl radical, phenylamino, alkoxycarbonyl having 1 to 8 carbon atoms in the alkoxy radical, $C_5$-$C_7$cycloalkylaminosulfonyl, nitro, cyano, trifluoromethyl, halogen, such as fluorine, bromine or in particular chlorine, sulfamoyl, sulfamoyl which is mono- or disubstituted on the nitrogen atom by $C_1$-$C_4$alkyl, $C_5$-$C_7$cycloalkyl or phenyl, carbamoyl, ureido, hydroxyl, $C_1$-$C_8$alkylsulfonyl, $C_1$-$C_8$alkylaminosulfonyl, $C_1$-$C_4$alkylsulfonylaminosulfonyl, phenylsulfonyl which is unsubstituted or substituted in the phenyl ring by $C_1$-$C_4$alkyl, halogen, for exmaple fluorine, chlorine or bromine, sulfo or sulfato, carboxyl, sulfomethyl, sulfo, sulfato, thiosulfato and phenyl, naphthyl, phenoxy, phenoxysulfonyl and phenylaminosulfonyl, it being possible for the phenyl or naphthyl radicals mentioned to be further substituted by the abovementioned substituents.

An arylsulfonyl radical R in formula (3) is, in particular, a phenylsulfonyl radical, which can be substituted as defined above for the benzene rings I to VI.

Alkyl radicals for $B_1$, $B_2$, $E_1$ and X in formula (4) are, independently of one another, straight-chain or branched alkyl radicals, for example methyl, ethyl, propyl, isopropyl, butyl, sec-butyl, isobutyl and tert-butyl.

Alkoxy radicals for $B_1$, $B_2$ and $E_1$ in formula (4) are, for example, the methoxy, ethoxy, propoxy, isopropoxy, butoxy, sec-butoxy, isobutoxy or tert-butoxy radical.

A hydroxyalkoxy radical for $B_1$, $B_2$ and $E_1$ in formula (4) is a straight-chain or branched hydroxyalkoxy radical, for example the $\beta$-hydroxyethoxy, $\beta$-hydroxypropoxy, $\beta$-hydroxybutoxy or $\alpha$-ethyl-$\beta$-hydroxyethoxy radical.

A hydroxyalkyl radical for X in formula (4) is a straight-chain or branched hydroxyalkyl radical, for example the $\beta$-hydroxyethyl, $\beta$-hydroxypropyl, $\beta$-hydroxybutyl or $\alpha$-ethyl-$\beta$-hydroxyethyl radical.

A dye mixture which contains a dye of the formula (1) in which $R_1$ is hydrogen, $C_{1-4}$alkyl, $C_{1-4}$alkoxy, halogen, $C_{2-4}$alkanoylamino or a phenylsulfonyl, naphthylsulfonyl, phenyloxy or phenylcarbonyl radical which is unsubstituted or substituted by $C_{1-4}$alkyl or halogen, $R_2$ is hydrogen, halogen, $C_{1-4}$alkyl, trifluoromethyl, a phenoxy or phenoxysulfonyl radical which is unsubstituted or substituted by $C_{1-4}$alkyl or halogen.

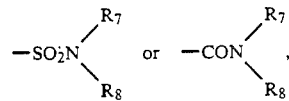

$R_3$ is $C_{1-4}$ alkyl or phenyl, $R_4$ is hydrogen or $C_{1-8}$alkyl and $R_7$ and $R_8$ independently of one another are hydrogen, $C_{1-4}$alkyl, $C_{1-4}$hydroxyalkyl, $C_{5-7}$cycloalkyl, phenyl or phenyl which is substituted by halogen, trifluoromethyl or $C_{1-4}$alkyl, and one or more dyes of the formulae (2), (3), (4) or (5) is preferred.

A dye mixture which contains, as the dye of the formula (1), a dye of the formula (6)

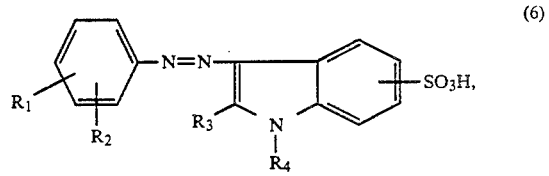

in which $R_1$, $R_2$, $R_3$ and $R_4$ are as defined under formula (1), in particular in which $R_1$ is hydrogen, methyl, chlorine, methoxy, ethoxy, o-methylphenoxy, phenoxy, acetylamino, phenylsulfonyl, p-methylphenylsulfonyl, p-chlorophenylsulfonyl, naphthylsulfonyl, p-methylbenzoyl or p-chlorobenzoyl, $R_2$ is hydrogen, chlorine, methyl, trifluoromethyl, o-methylphenoxy, o-chlorophenoxy, o-chlorophenoxysulfonyl, —$SO_2NH_2$, N-$C_{1-2}$alkylaminosulfonyl, N,N-dimethylaminosulfonyl, N-methyl-N-β-hydroxyethylaminosulfonyl, N-methyl-N-cyclohexylaminosulfonyl, N-phenylaminosulfonyl, N-o-methylphenylaminosulfonyl, N-o-chlorophenylaminosulfonyl, N-m-trifluoromethylphenylaminosulfonyl, N-ethyl-N-phenylaminosulfonyl, —CONH$_2$ or —CON(CH$_3$)$_2$, R$_3$ is methyl or phenyl and R$_4$ is hydrogen, methyl, ethyl or octyl, and one or more dyes of the formulae (2), (3), (4) or (5) is particularly preferred.

A dye mixture containing a dye of the formula (6) and at least one dye of the formula

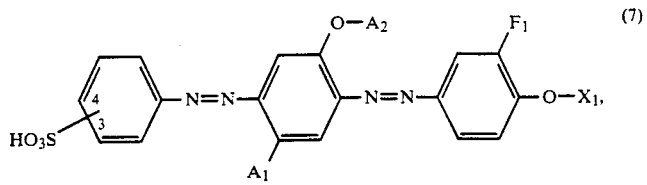

(7)

in which A$_1$ is hydrogen or methyl, F$_1$ is hydrogen or methyl, A$_2$ and X$_1$ independently of one another are methyl, ethyl, β-hydroxyethyl, β-hydroxypropyl, β-hydroxybutyl or α-ethyl-β-hydroxyethyl and the sulfo group is bonded in the 3- or 4-position, is especially preferred.

Preferred dyes of the formula (7) are, for example, the following dyes:

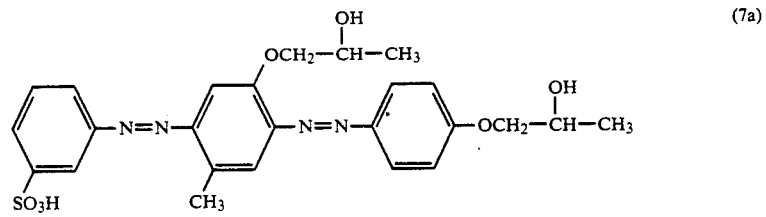

(7a)

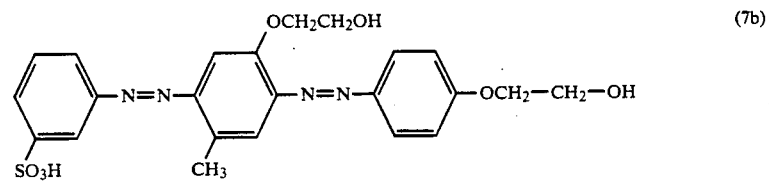

(7b)

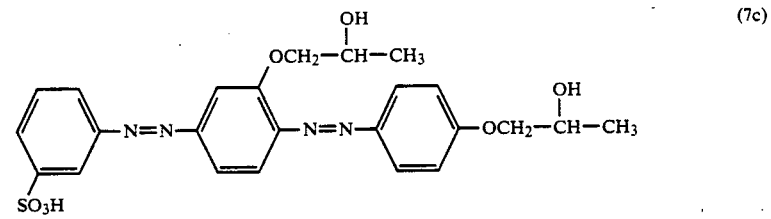

(7c)

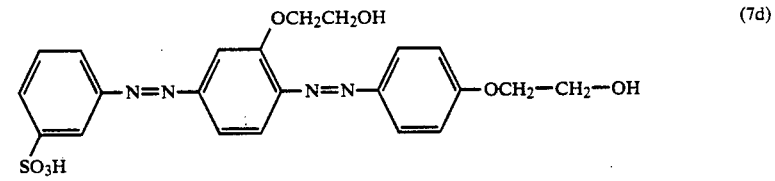

(7d)

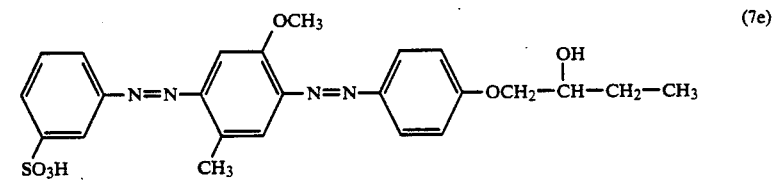

(7e)

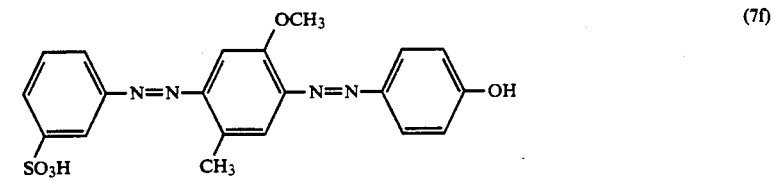

(7f)

-continued
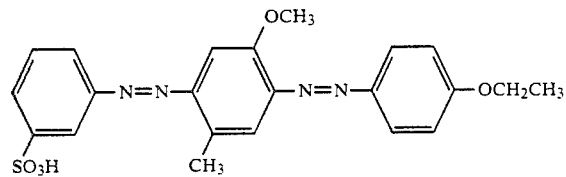 (7g)
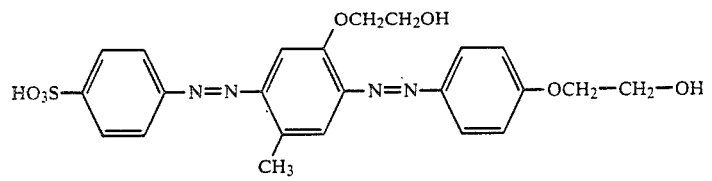 (7h)
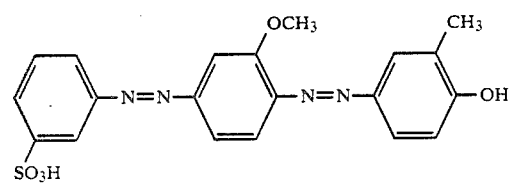 (7i)
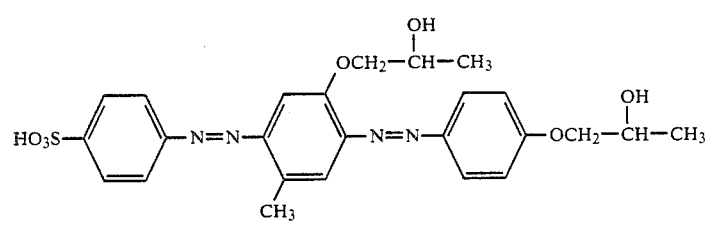 (7j)
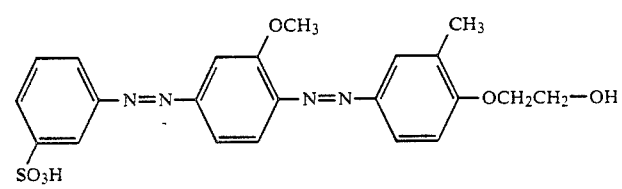 (7k)
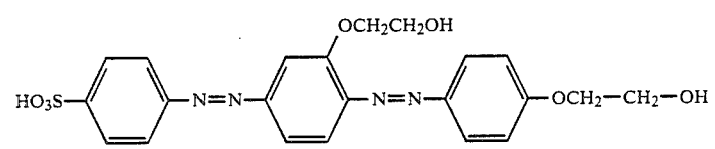 (7l)
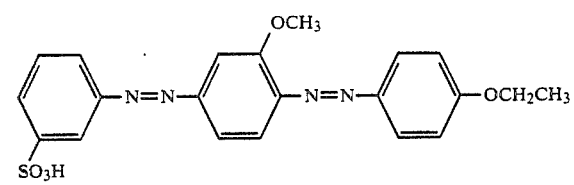 (7m)
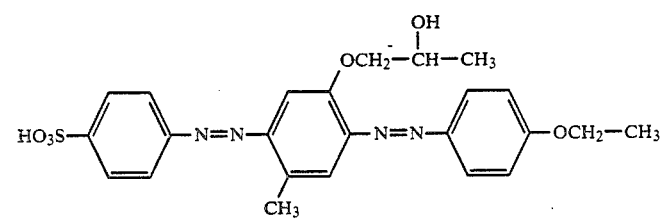 (7n)
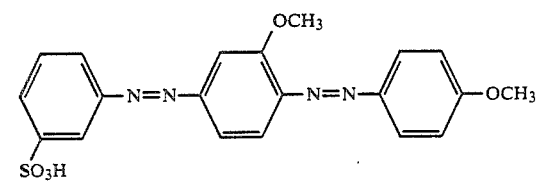 (7o)

-continued
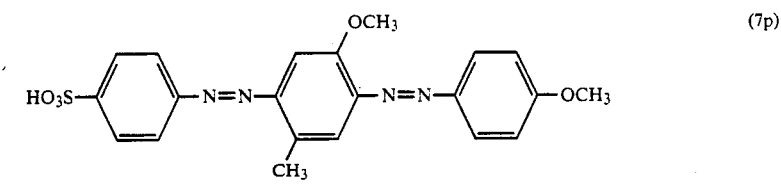
(7p)
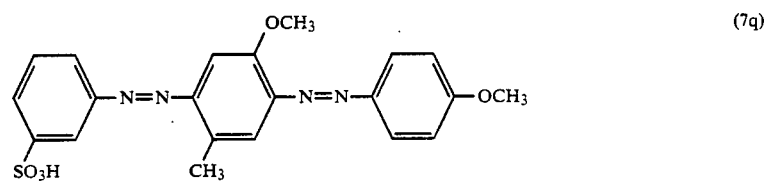
(7q)
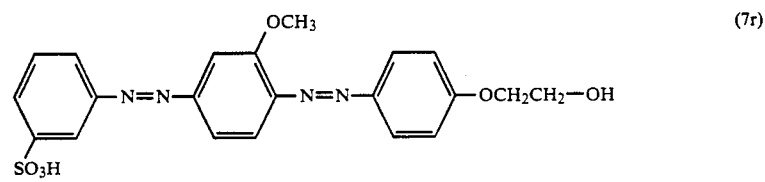
(7r)
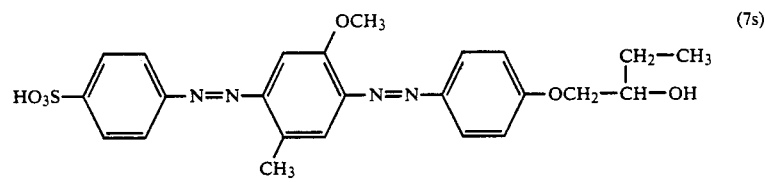
(7s)
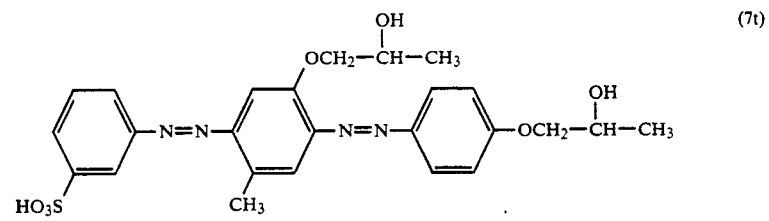
(7t)
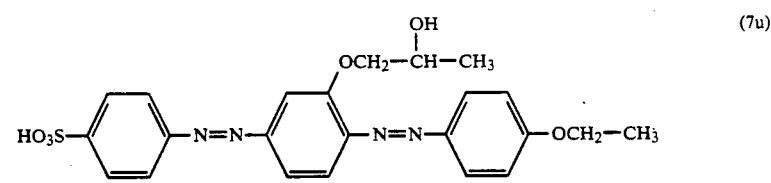
(7u)
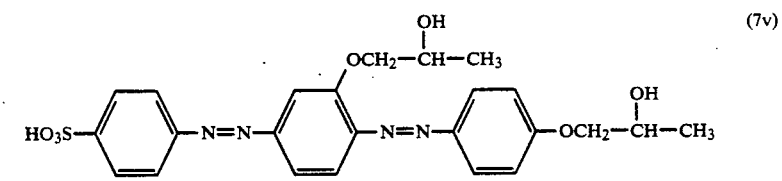
(7v)
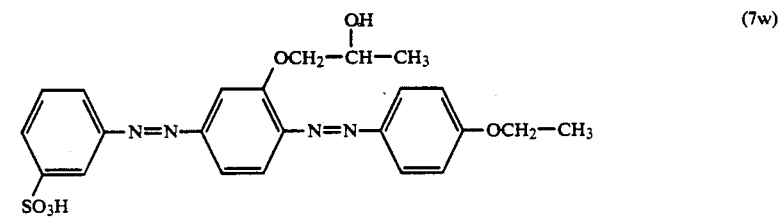
(7w)

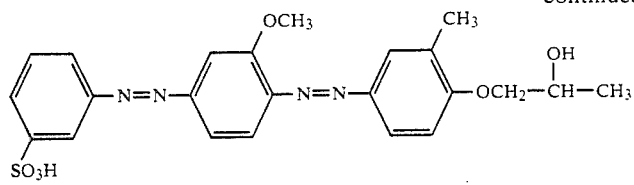 (7x)

or

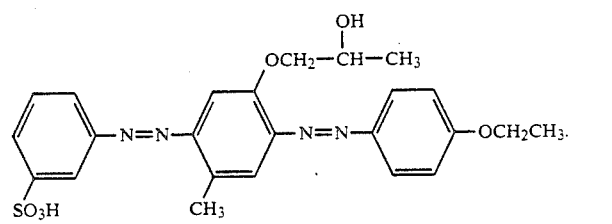 (7y)

A dye mixture containing a dye of the formula (6) and at least one dye of the formulae (8), (9), (10) and (11)

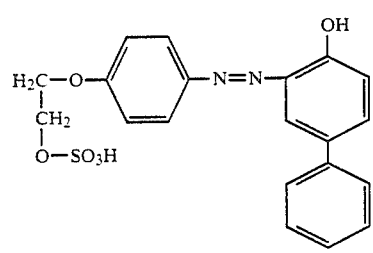 (8)

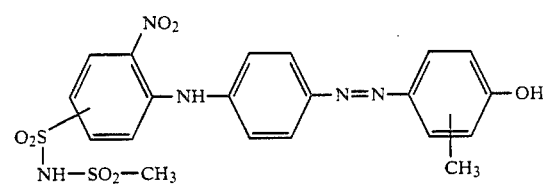 (9)

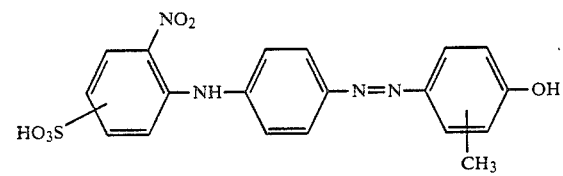 (10)

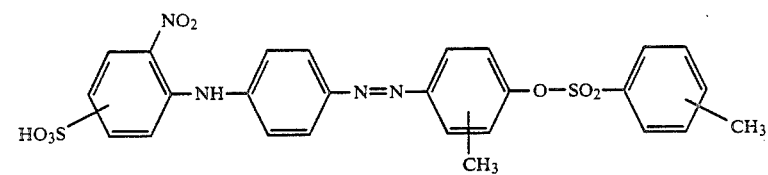 (11)

is likewise especially preferred. The dye mixture contains in particular a dye of the formula (6) and a dye of the formula (8), (9), (10) or (11).

A dye mixture containing a dye of the formula (6) and dye of the formula

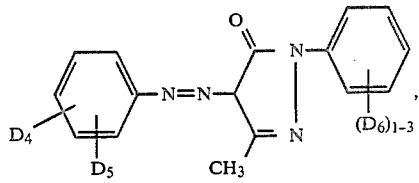 (12)

in which $D_4$ is chlorine or phenylaminosulfonyl, $D_5$ is hydrogen or sulfo and $(D_6)_{1-3}$ is 1 to 3 substituents $D_6$, and $D_6$ is hydrogen, chlorine or sulfo, is furthermore especially preferred.

Preferred dyes of the formula (12) are, for example, the following dyes:

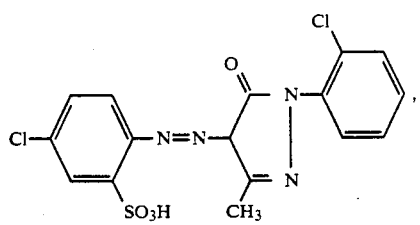
(12a)

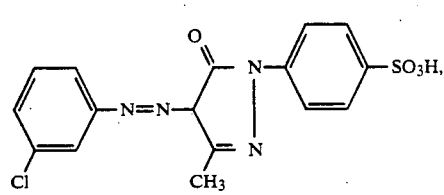
(12b)

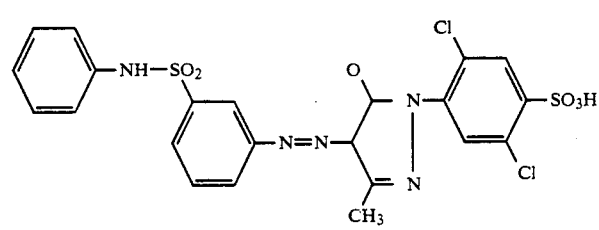
(12c)

or

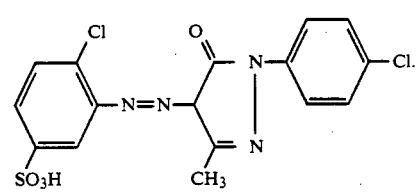
(12d)

A dye mixture containing a dye of the formula

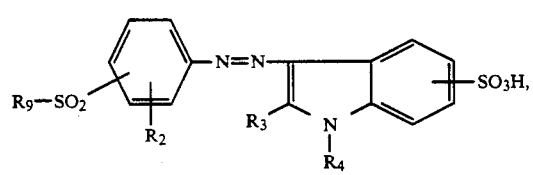
(13)

in which $R_2$, $R_3$ and $R_4$ are as defined under formula (6) and $R_9$ is a phenyl radical which is unsubstituted or substituted by $C_{1-4}$alkyl and halogen, or naphthyl, in particular in which $R_2$ is hydrogen, $R_3$ is phenyl, $R_4$ is hydrogen and $R_9$ is phenyl, and a dye of the formula (7), in particular a dye of the formula (7a) to (7y), is particularly important.

A dye mixture containing the dye of the formula

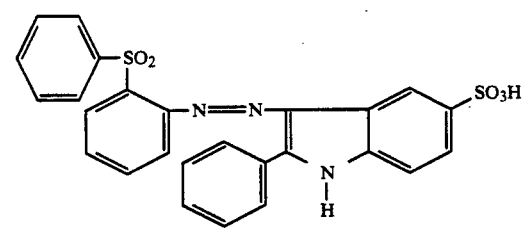
(14)

and the dye of the formula

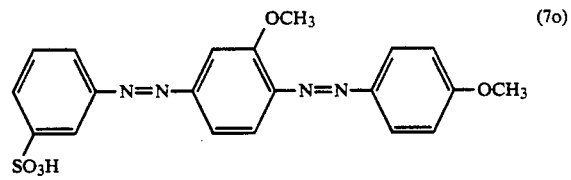
(7o)

or the dye of the formula

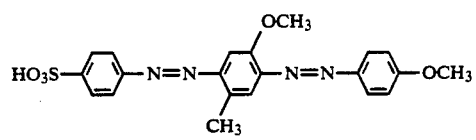
(7p)

is especially important.

A dye mixture containing a dye of the formula (13) and a dye of the formula (8), (9), (10) or (11) is furthermore particularly important.

A dye mixture containing the dye of the formula (14) and the dye of the formula (8) or the dye of the formula

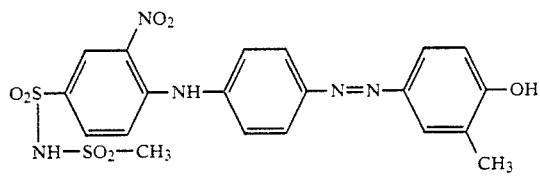

(15)

or

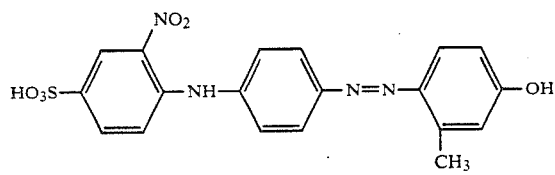

(16)

or

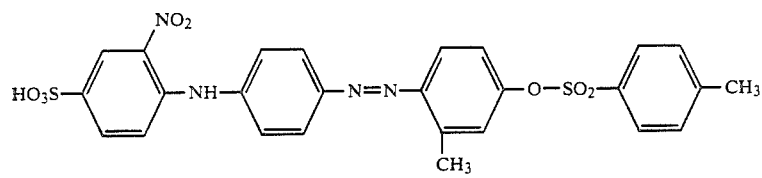

(17)

is furthermore especially important.

In the dye mixtures according to the invention, the ratio of the dyes of the formulae (1) and (2) or (3) or (1) and (4) or (5) of 20:80 to 80:20, and in particular 40:60 to 60:40, is preferred. The ratio of the dyes of the formulae (1) and (2) or (1) and (3) or (1) and (4) or (1) and (5) and in particular (14) and (8), (9), (10) or (11) and (14) and (15), (16) or (17) and (14) and (7) and (14) and (7o) or (7p) of 55:45 to 45:55 is especially preferred. In the dye mixtures according to the invention containing three dyes, the ratio of the dye of the formula (1) and the two dyes of the formulae (2) to (5) is 10:10:80, 10:80:10 to 80:10:10, in particular 20:20:60, 20:60:20 to 60:20:20.

The dyes of the formulae (1), (2), (3), (4) and (5) are known.

The dye mixture according to the invention can be prepared by mixing the individual dyes. This mixing process is carried out, for example, in suitable mills, for example ball and pinned disc mills, and in kneaders or mixers.

The dye mixtures can furthermore be prepared by spray drying the aqueous dye mixtures.

The invention furthermore relates to a process for dyeing and printing naturally occurring or synthetic polyamide materials with a dye mixture containing a dye of the formula (1) and at least one dye of the formulae (2), (3), (4) and (5). Synthetic polyamide materials are, for example, polyamide 6.6 or polyamide 6 fibre materials, and a naturally occurring polyamide material is, for example, wool. The usual dyeing and printing processes are used here for dyeing and printing.

The dye mixture containing a dye of the formula (1) and at least one dye of the formulae (2), (3), (4) and (5) is particularly suitable for dyeing and printing in combination with other dyes, and in particular for dyeing and printing by the trichromicity principle. Trichromicity is understood here as meaning additive colour blending of three appropriately selected yellow-, red- and blue-colouring dyes in the amounts needed to achieve the desired shade. The dye mixture according to the invention is particularly suitable for dyeing from short liquors, for example in continuous dyeing processes or discontinuous and continuous foam dyeing processes.

The dye mixture according to the invention is distinguished by generally good properties, for example good solubility, stability in cold solution, good absorption properties and in particular a good capacity for combination with other dyes as well as good uniform affinity properties on various fibre materials.

The textile material to be dyed or printed can be in various processing forms, for example as fibre, yarn, woven fabric or knitted fabric and in particular in the form of carpets.

The dyes of the formula (1), (2), (3), (4) and (5) are present in the dye mixture according to the invention either in the form of their free sulfonic acid or, preferably, as salts thereof, for example the alkali metal, alkaline earth metal or ammonium salts, or as salts of an organic amine. Examples are the sodium, lithium or ammonium salts or the triethanolamine salt.

The dye mixture as a rule contains further additives, for example sodium chloride or dextrin.

The dye liquors or printing pastes can likewise contain further additives, for example wetting agents, antifoams, levelling assistants or agents which influence the property of the textile material, for example softeners, additives for a flame retardant finish or soil-, water- and oil-repellent agents, as well as water-softening agents and naturally occurring or synthetic thickeners, for example alginates and cellulose ethers.

In the following examples, the parts are by weight. The temperatures are degrees Centigrade. Parts by weight and parts by volume bear the same relationship to one another as the gram and the cubic centimetre.

EXAMPLE 1A

To prepare the dye mixture containing a dye of the formula

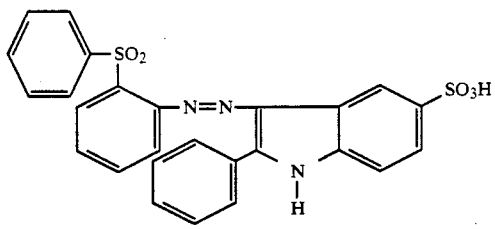

and a dye of the formula

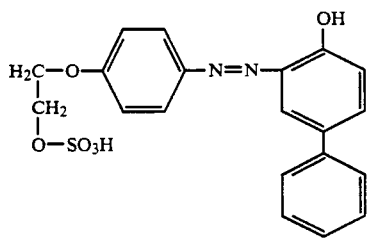

or

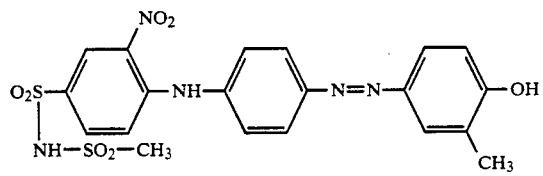

or

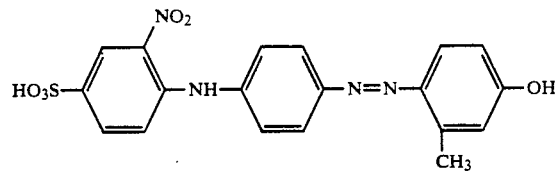

or

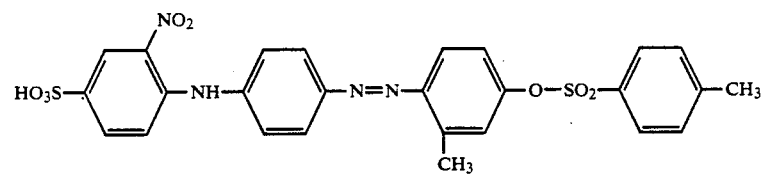

in a mixer, a) 30 parts of the dye of the formula (101) and 70 parts of the dye of the formula (102) are mixed homogeneously to give 100 parts of the mixture called dye mixture A below;

b) 60 parts of the dye of the formula (101) and 40 parts of the dye of the formula (102) are mixed homogeneously to give 100 parts of the mixture called dye mixture B below;

c) 80 parts of the dye of the formula (101) and 20 parts of the dye of the formula (104) are mixed homogeneously to give 100 parts of the mixture called dye mixture C below;

d) 30 parts of the dye of the formula (105) and 70 parts of the dye of the formula (101) are mixed homogeneously to give 100 parts of the mixture called dye mixture D below;

e) 60 parts of the dye of the formula (103) and 40 parts of the dye of the formula (101) are mixed homogeneously to give 100 parts of the mixture called dye mixture E below; and f) 80 parts of the dye of the formula (104) and 20 parts of the dye of the formula (101) are mixed homogeneously to give 100 parts of the mixture called dye mixture F below.

EXAMPLE 1B

To prepare the dye mixture containing a dye of the formula (102)

(103)

(104)

(105)

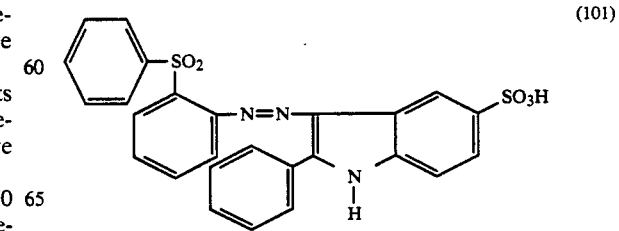

and a dye of the formula

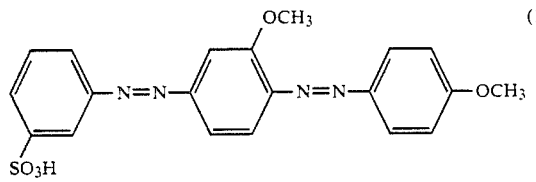
(106)

or a dye of the formula

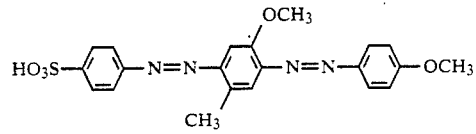
(107)

in a mixer, g) 30 parts of the dye of the formula (101) and 70 parts of the dye of the formula (106) are mixed homogeneously to give 100 parts of the mixture called dye mixture G below;

h) 60 parts of the dye of the formula (101) and 40 parts of the dye of the formula (106) are mixed homogeneously to give 100 parts of the mixture called dye mixture H below;

i) 80 parts of the dye of the formula (101) and 20 parts of the dye of the formula (106) are mixed homogeneously to give 100 parts of the mixture called dye mixture I below;

j) 30 parts of the dye of the formula (107) and 70 parts of the dye of the formula (101) are mixed homogeneously to give 100 parts of the mixture called dye mixture J below;

k) 60 parts of the dye of the formula (107) and 40 parts of the dye of the formula (101) are mixed homogeneously to give 100 parts of the mixture called dye mixture K below; and l) 80 parts of the dye of the formula (107) and 20 parts of the dye of the formula (101) are mixed homogeneously to give 100 parts of the mixture called dye mixture L below.

EXAMPLE 2

10 parts of polyamide 6.6 fibre material (Helanca tricot) are dyed in 500 parts of an aqueous liquor which contains 2 g/l of ammonium acetate and has been brought to pH 5 with acetic acid. The dyes used are 0.27% of the yellow dye mixture A according to Example 1a), 0.12% of the red dye of the formula

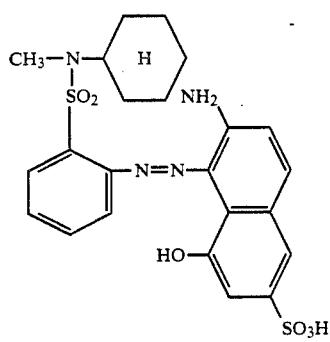
(108)

and 0.13% of the dye of the formula

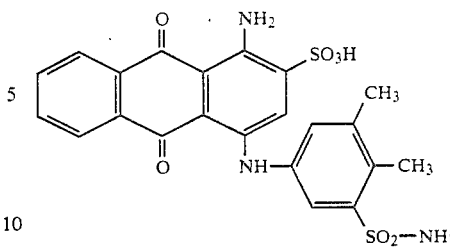
(109)

the amounts stated being based on the fibre weight. The dyeing time at a temperature of 60 to 98° is 30 to 90 minutes. The dyed polyamide 6.6 fibre material is then taken out of the liquor and rinsed and dried in the customary manner. A piece of fabric which is dyed completely levelly in a neutral brown colour shade and has no material-related streakiness at all is obtained.

If instead of 0.27% of the yellow dye mixture A and 0.12% of the red dye of the formula (108) and 0.13% of the blue dye of the formula (109) the dyes of the formulae (108) and (109) shown in the following table and the dye mixtures from Example 1 are used, the fabric pieces dyed completely levelly in the colour shade stated are obtained.

TABLE 1

| Example | Dye used | Color shade |
|---|---|---|
| 3 | 0.18% of dye mixture B<br>0.18% of the dye of the formula (108)<br>0.077% of the dye of the formula (109) | reddish-tinged brown |
| 4 | 0.25% of dye mixture C<br>0.04% of the dye of the formula (108)<br>0.14% of the dye of the formula (109) | olive |
| 5 | 0.27% of dye mixture D<br>0.12% of the dye of the formula (108)<br>0.13% of the dye of the formula (109) | neutral brown |
| 6 | 0.18% of dye mixture E<br>0.17% of the dye of the formula (108)<br>0.07% of the dye of the formula (109) | reddish-tinged brown |
| 7 | 0.25% of dye mixture F<br>0.036% of the dye of the formula (108)<br>0.124% of the dye of the formula (109) | olive |
| 8 | 0.18% of dye mixture H<br>0.18% of the dye of the formula (108)<br>0.077% of the dye of the formula (109) | reddish-tinged brown |
| 9 | 0.25% of dye mixture I<br>0.04% of the dye of the formula (108)<br>0.14% of the dye of the formula (109) | olive |
| 10 | 0.27% of dye mixture J<br>0.12% of the dye of the formula (108)<br>0.13% of the dye of the formula (109) | neutral brown |
| 11 | 0.18% of dye mixture K<br>0.17% of the dye of the formula (108)<br>0.07% of the dye of the formula (109) | reddish-tinged brown |
| 12 | 0.25% of dye mixture L<br>0.036% of the dye of the formula (108)<br>0.124% of the dye of the formula (109) | olive |
| 13 | 0.27% of dye mixture G<br>0.12% of the dye of the formula (108)<br>0.13% of the dye of the formula (109) | brown |

EXAMPLE 14

10 parts of polyamide 66 yarn are dyed in 400 parts of an aqueous liquor which contains 1.5 g/l of ammonium acetate and has been brought to pH 5.5 with acetic acid. The dyes used are 0.27% of the dye mixture H, 0.12% of the dye of the formula (108) and 0.13% of the dye of the formula (109), the amounts stated being based on the fibre weight. The dye bath is heated to 98° in the course of 30 minutes and kept at 96° to 98° for 60 minutes. The dyed yarn is then taken out of the bath and rinsed and dried in the customary manner. Yarn dyed a neutral brown colour shade is obtained.

If instead of the dye mixture H 0.27% of the dye mixture B is used, a yarn dyed in a neutral brown colour shade is likewise obtained.

EXAMPLE 15

Carpet Exhaustion Process

The main components of a beam dyeing apparatus (laboratory piece-dyeing apparatus, model 10 from Rudolf Then) consist of the horizontal dyeing kettle with a cooling jacket, which is connected to a circulation system with the secondary kettle using a special circulating pump.

A cloth beam charged with a polyamide 6 loop pile carpet 50 cm wide, 135 cm long and weighing 380 g is introduced into this dyeing apparatus. 6 liters of softened water have been introduced into the secondary kettle and 60 ml of 2N sodium hydroxide solution have been added. By opening the appropriate valves (secondary kettle or connection lines, pump/dyeing kettle), the liquor flows out of the secondary kettle under its own head into the dyeing kettle, during which the air displaced flows out through a vent line in the secondary kettle. After the dyeing apparatus has been filled, a liquor residue about 5 cm high remains in the secondary kettle, and the circulating pump is then switched on. To monitor the pH, a bore is made in the pipeline between the dyeing and secondary kettle (flow direction) and a combined glass electrode is inserted. The dye liquor circulates from the inside outwards throughout the entire dyeing process, during which the pressure gradient is 0.1 to 0.2 bar and the delivery of the pump is about 6 liters per minute. The liquor is heated to 98° and 7.6 g of an anionic levelling assistant having affinity for the fibre, dissolved in 100 ml of water, are added to the secondary kettle in the course of 5 minutes.

The dyeing temperature is set at 97° to 98° and the pH is 10.7. The pH of a sample which has been removed and cooled to 20° is 11.9.

2.5 g of the yellow dye mixture H and 1.8 g of the blue dye of the formula (109), both dissolved in 200 ml of hot water, are now allowed to run from a dropping funnel into the secondary kettle in the course of 10 minutes. After 30 minutes, a total of 100 ml of 1N sulfuric acid are metered in by means of a piston burette at a rate of 5.5 ml per minute for 10 minutes and at a rate 2.25 ml per minute for a further 20 minutes.

After a further 10 minutes the pH is 3.8. The dye bath is exhausted, that is to say the dyes have been absorbed onto the goods to be dyed to the extent of more than 99%. The heating is switched off and the dye liquor is cooled to 60° with the aid of the indirect cooling. During this period, the pH increases to 3.9. The almost water-clear liquor is pumped back into the secondary kettle and the cloth beam is removed. The carpet material is unwound, centrifuged and dried. The polyamide 6 loop pile carpet is dyed a level green over the surface.

If the procedure is as described in Example 15 and instead of the dye mixture H used in that example the same amount of a dye mixture of 50% by weight of the dye of the formula (101) and 50% by weight of one of the dyes shown in the following table is used, polyamide 6 loop pile carpet which is dyed a level green over the surface are likewise obtained.

TABLE

| Example | Structure | |
|---|---|---|
| 16 | [phenyl-SO₃H]–N=N–[phenyl with OCH₂–CH(OH)–CH₃ and CH₃]–N=N–[phenyl-OCH₂–CH(OH)–CH₃] | (110) |
| 17 | [phenyl-SO₃H]–N=N–[phenyl with OCH₂CH₂OH and CH₃]–N=N–[phenyl-OCH₂–CH₂–OH] | (111) |
| 18 | [phenyl-SO₃H]–N=N–[phenyl with OCH₂–CH(OH)–CH₃]–N=N–[phenyl-OCH₂–CH(OH)–CH₃] | (112) |
| 19 | [phenyl-SO₃H]–N=N–[phenyl with OCH₂CH₂OH]–N=N–[phenyl-OCH₂–CH₂–OH] | (113) |

TABLE-continued

| Example | | |
|---|---|---|
| 20 | 3-HO₃S-C₆H₄-N=N-[2-OCH₃,5-CH₃-C₆H₂]-N=N-C₆H₄-OCH₂-CH(OH)-CH₂-CH₃ | (114) |
| 21 | 3-HO₃S-C₆H₄-N=N-[2-OCH₃,5-CH₃-C₆H₂]-N=N-C₆H₄-OH | (115) |
| 22 | 3-HO₃S-C₆H₄-N=N-[2-OCH₃,5-CH₃-C₆H₂]-N=N-C₆H₄-OCH₂CH₃ | (116) |
| 23 | 4-HO₃S-C₆H₄-N=N-[2-OCH₂CH₂OH,5-CH₃-C₆H₂]-N=N-C₆H₄-OCH₂-CH₂-OH | (117) |
| 24 | 3-HO₃S-C₆H₄-N=N-[3-OCH₃-C₆H₃]-N=N-[3-CH₃,4-OH-C₆H₃] | (118) |
| 25 | 4-HO₃S-C₆H₄-N=N-[2-OCH₂CH(OH)CH₃,5-CH₃-C₆H₂]-N=N-C₆H₄-OCH₂-CH(OH)-CH₃ | (119) |
| 26 | 3-HO₃S-C₆H₄-N=N-[3-OCH₃-C₆H₃]-N=N-[3-CH₃,4-OCH₂CH₂OH-C₆H₃] | (120) |
| 27 | 4-HO₃S-C₆H₄-N=N-[3-OCH₂CH₂OH-C₆H₃]-N=N-C₆H₄-OCH₂-CH₂-OH | (121) |

| Example | | |
|---|---|---|
| 28 | 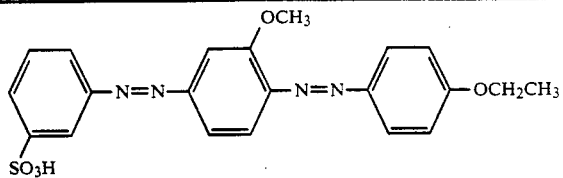 | (122) |
| 29 | 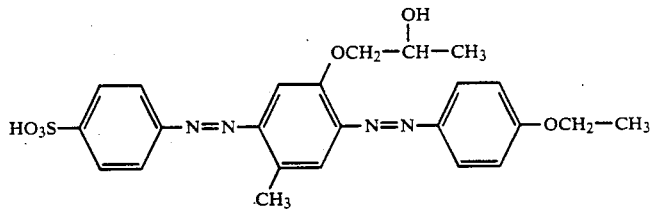 | (123) |
| 30 | 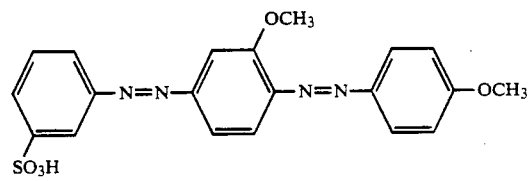 | (106) |
| 31 | 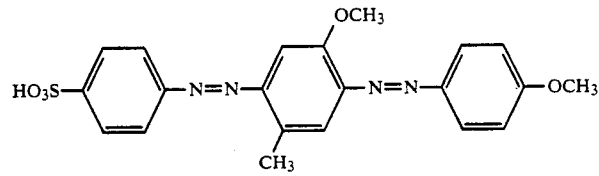 | (107) |
| 32 | 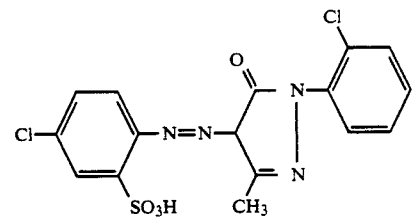 | (124) |
| 33 | 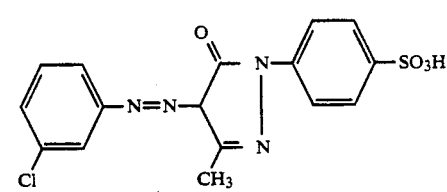 | (125) |
| 34 | 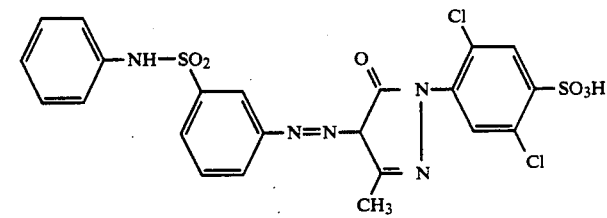 | (126) |
| 35 | 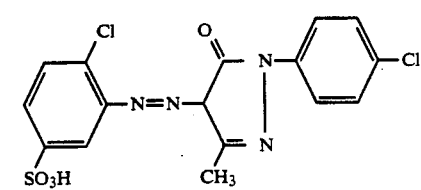 | (127) |

TABLE-continued
| Example | | |
|---|---|---|
| 36 | 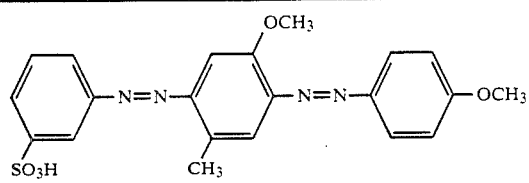 | (128) |
| 37 | 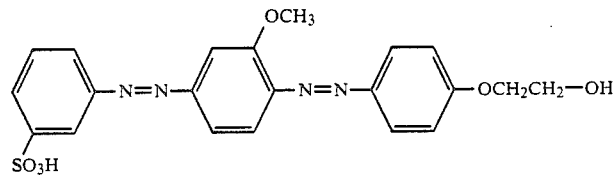 | (129) |
| 38 | 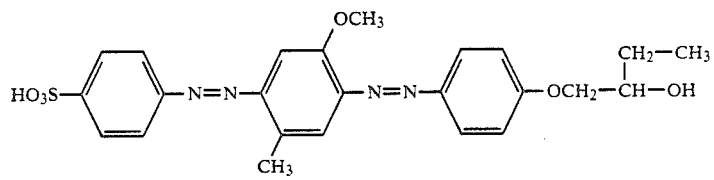 | (130) |
| 39 | 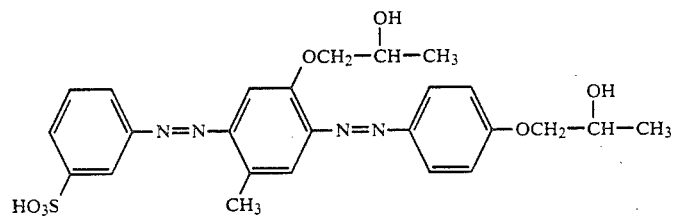 | (131) |
| 40 | 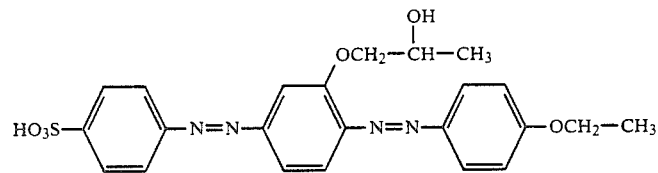 | (132) |
| 41 | 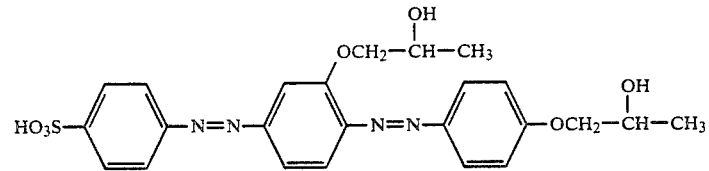 | (133) |
| 42 | 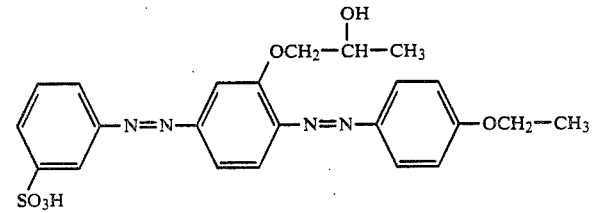 | (134) |
| 43 | 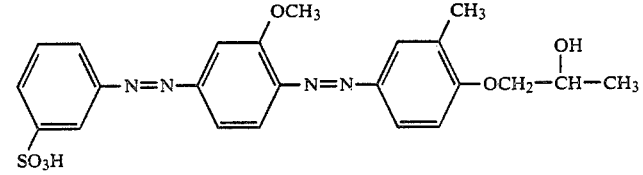 | (135) |

TABLE-continued

| Example | | |
|---|---|---|
| 44 | 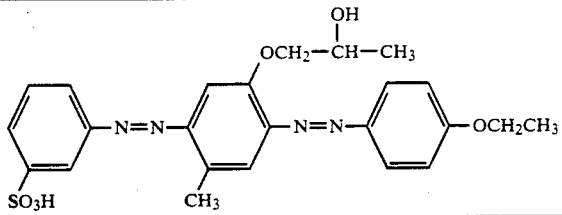 | (136). |

EXAMPLE 45

To prepare a dye mixture containing a dye of the formula (101) and a dye of the formula (106) and a dye of the formula (107), 30 parts of the dye of the formula (101), 35 parts of the dye of the formula (106) and 35 parts of the dye of the formula (107) are mixed homogeneously in a mixer.

10 parts of polyamide 66 yarn are dyed in 400 parts of an aqueous liquor which contains 1.5 g/l of ammonium acetate and has been brought to pH 5.5 with acetic acid. The dyes used are 0.27% of the dye mixture described above, 0.12% of the dye of the formula (108) and 0.13% of the dye of the formula (109), the amounts stated being based on the fibre weight. The dye bath is heated to 98° in the course of 30 minutes and kept at 96° to 98° for 60 minutes. The dyed yarn is then taken out of the bath and rinsed and dried in the customary manner. A yarn dyed a neutral brown colour shade is obtained.

EXAMPLE 46

To prepare a dye mixture containing a dye of the formula (101) and a dye of the formula (102) and a dye of the formula (104), 30 parts of the dye of the formula (101), 35 parts of the dye of the formula (102) and 35 parts of the formula (104) are mixed homogeneously in a mixer.

10 parts of polyamide 66 yarn are dyed in 400 parts of an aqueous liquor which contains 1.5 g/l of ammonium acetate and has been brought to pH 5.5 with acetic acid. The dyes used are 0.27% of the dye mixture described above, 0.12% of the dye of the formula (108) and 0.13% of the dye of the formula (109), the amounts stated being based on the fibre weight. The dye bath is heated to 98° in the course of 30 minutes and kept at 96° to 98° for 60 minutes. The dyed yarn is then taken out of the bath and rinsed and dried in the customary manner. A yarn dyed in a neutral brown colour shade is obtained.

What is claimed is:

1. A dye mixture containing a dye of the formula

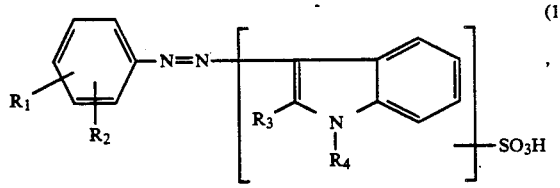 (1)

in which $R_1$ is hydrogen, $C_{1-4}$alkyl, $C_{1-4}$alkoxy, halogen, $C_{2-4}$alkanoylamino or a phenylsulfonyl, naphthylsulfonyl, phenyloxy or phenylcarbonyl radical which is unsubstituted or substituted by $C_{1-4}$alkyl or halogen, $R_2$ is hydrogen, halogen, $C_{1-4}$alkyl, trifluoromethyl, a phenoxy or phenoxysulfonyl radical which is unsubstituted or substituted by $C_{1-4}$alkyl or halogen,

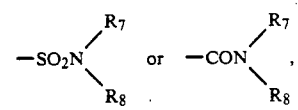

$R_3$ is $C_{1-4}$alkyl or phenyl, $R_4$ is hydrogen or $C_{1-8}$alkyl and $R_7$ and $R_8$ independently of one another are hydrogen, $C_{1-4}$alkyl, · $C_{1-4}$hydroxyalkyl, $C_{5-7}$cycloalkyl, phenyl or phenyl which is substituted by halogen, trifluoromethyl or $C_{1-4}$alkyl, and at least one dye of the formulae (2), (3), (4), (7f), (7i) and (12)

$$\underset{I}{\bigcirc}-N=N-\underset{II}{\bigcirc}\overset{OH}{\underset{III}{-\bigcirc}} \quad (2)$$

in which the benzene rings I, II and III are unsubstituted or substituted by $C_{1-8}$alkyl which is unsubstituted or substituted by sulfo or sulfato, $C_{1-8}$alkoxy, $C_{1-8}$alkoxy which is substituted in the alkyl radical by sulfo or sulfato, $C_{2-8}$alkanoylamino, alkoxycarbonylamino groups having 2 to 8 carbon atoms, $C_{2-8}$alkanoyl, $C_5-C_7$cycloalkylcarbonyl, $C_5-C_7$cycloalkylcarbonyl which is substituted in the cycloalkyl ring by $C_1-C_4$alkyl, halogen, sulfo or sulfato, benzoyl, benzoyl which is substituted in the phenyl ring by $C_1-C_4$alkyl, halogen, sulfo or sulfato, benzothiazole or benzoxazole which is unsubstituted or substituted by $C_1-C_4$alkyl, halogen, sulfo or sulfato, benzoylamino, amino, mono- or dialkylamino having 1 to 8 carbon atoms in the alkyl radical, phenylamino, alkoxycarbonyl having 1 to 8 carbon atoms in the alkoxy radical, $C_5-C_7$cycloalkylaminosulfonyl, nitro, cyano, trifluoromethyl, halogen, sulfamoyl, sulfamoyl which is mono- or disubstituted on the nitrogen atom by $C_1-C_4$alkyl, $C_5-C_7$cycloalkyl or phenyl, carbamoyl, ureido, hydroxyl, $C_1-C_8$alkylsulfonyl, $C_1-C_8$alkylaminosulfonyl, $C_1-C_4$alkylsulfonylaminosulfonyl, phenylsulfonyl which is unsubstituted or substituted in the phenyl ring by $C_1-C_4$alkyl, halogen, sulfo or sulfato, carboxyl, sulfomethyl, sulfo, sulfato, thiosulfato, phenyl, naphthyl, phenoxy, phenoxysulfonyl and phenylaminosulfonyl, and wherein the dye of formula (2) contains sulfato,

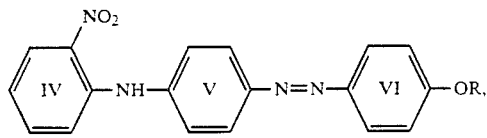

in which R is hydrogen or arylsulfonyl, R as arylsulfonyl and the benzene rings IV, V and VI are unsubstituted or substituted by $C_{1-8}$alkyl which is unsubstituted or substituted by sulfo or sulfato, $C_{1-8}$alkoxy, $C_{1-8}$alkoxy which is substituted in the alkyl radical by sulfo or sulfato, $C_{2-8}$alkanoylamino, alkoxycarbonylamino groups having 2 to 8 carbon atoms, $C_{2-8}$alkanoyl, $C_5-C_7$cycloalkylcarbonyl, $C_5-C_7$cycloalkylcarbonyl which is substituted in the cycloalkyl ring by $C_1-C_4$alkyl, halogen, sulfo or sulfato, benzoyl, benzoyl which is substituted in the phenyl ring by $C_1-C_4$alkyl, halogen, sulfo or sulfato, benzothiazole or benzoxazole which is unsubstituted or substituted by $C_1-C_4$alkyl, halogen, sulfo or sulfato, benzoylamino, amino, mono- or dialkylamino having 1 to 8 carbon atoms in the alkyl radical, phenylamino, alkoxycarbonyl having 1 to 8 carbon atoms in the alkoxy radical, $C_5-C_7$cycloalkylaminosulfonyl, nitro, cyano, trifluoromethyl, halogen, sulfamoyl, sulfamoyl which is mono- or disubstituted on the nitrogen atom by $C_1-C_4$alkyl, $C_5-C_7$cycloalkyl or phenyl, carbamoyl, ureido, hydroxyl, $C_1-C_8$alkylsulfonyl, $C_1-C_8$alkylaminosulfonyl, $C_1-C_4$alkylsulfonylaminosulfonyl, phenylsulfonyl which is unsubstituted or substituted in the phenyl ring by $C_1-C_4$alkyl, halogen, sulfo or sulfato, carboxyl, sulfomethyl, sulfo, sulfato, thiosulfato, phenyl, naphthyl, phenoxy, phenoxysulfonyl and phenylaminosulfonyl, and wherein the dye of formula (3) contains sulfo or $C_1-C_4$alkylsulfonylaminosulfonyl,

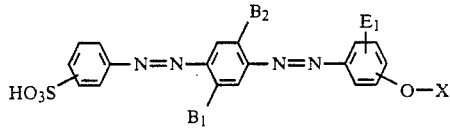

in which $B_1$, $B_2$ and $E_1$ are hydrogen, $C_{1-4}$alkyl, $C_{1-4}$alkoxy or $C_{2-4}$hydroxyalkoxy and X is hydrogen, straight-chain or branched $C_{1-4}$alkyl or straight-chain or branched $C_{2-4}$hydroxyalkyl, and

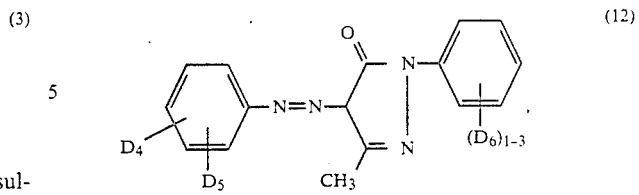

in which $D_4$ is chlorine or phenylaminosulfonyl, $D_5$ is hydrogen or sulfo and $(D_6)_{1-3}$ is 1 to 3 substituents $D_6$, and $D_6$ is hydrogen, chlorine or sulfo, and wherein the dye of the formula (12) contains a sulfo group.

2. A dye mixture according to claim 1, which contains, as the dye of the formula (1), a dye of the formula

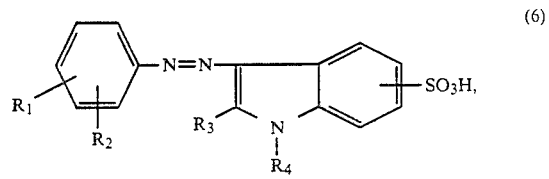

in which $R_1$ is hydrogen, methyl, chlorine, methoxy, ethoxy, o-methylphenoxy, phenoxy, acetylamino, phenylsulfonyl, p-methylphenylsulfonyl, p-chlorophenylsulfonyl, naphthylsulfonyl, p-methylbenzoyl or p-chlorobenzoyl, $R_2$ is hydrogen, chlorine, methyl, trifluoromethyl, o-methylphenoxy, o-chlorophenoxy, o-chlorophenoxysulfonyl, —$SO_2NH_2$, N-$C_{1-2}$alkylaminosulfonyl, N,N-dimethylaminosulfonyl, N-methyl-N-$\beta$-hydroxyethylaminosulfonyl, N-methyl-N-cyclohexylaminosulfonyl, N-phenylaminosulfonyl, N-o-methylphenylaminosulfonyl, N-o-chlorophenylaminosulfonyl, N-m-trifluoromethylphenylaminosulfonyl, N-ethyl-N-phenylaminosulfonyl, —$CONH_2$ or —$CON(CH_3)_2$, $R_3$ is methyl or phenyl and $R_4$ is hydrogen, methyl, ethyl or octyl, and one or more dyes of the formulae (2), (3), (4) or (12).

3. A dye mixture according to claim 2 containing a dye of the formula (6) and at least one dye of the formula

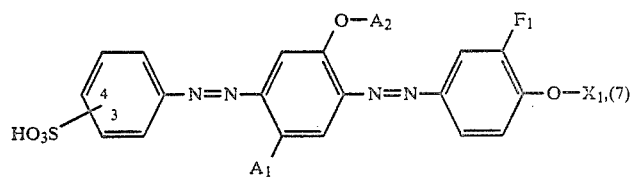

in which $A_1$ is hydrogen or methyl, $F_1$ is hydrogen or methyl, $A_2$ $X_1$ also being hydrogen and $X_1$ independently of one another are methyl, ethyl, $\beta$-hydroxyethyl, $\beta$-hydroxypropyl, $\beta$-hydroxybutyl or $\alpha$-ethyl-$\beta$-hydroxyethyl and the sulfo group is bonded in the 3- or 4-position.

4. A dye mixture according to claim 3, which contains, as the dye of the formula (7), at least one of the dyes of the formulae (7a) to (7y)

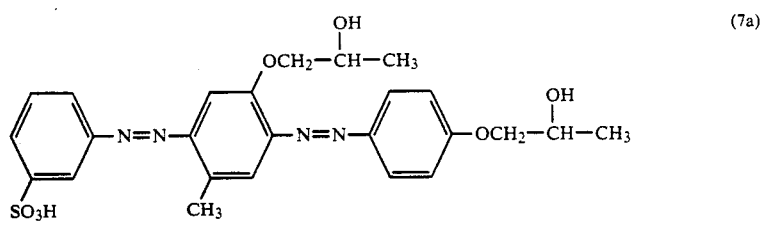
(7a)
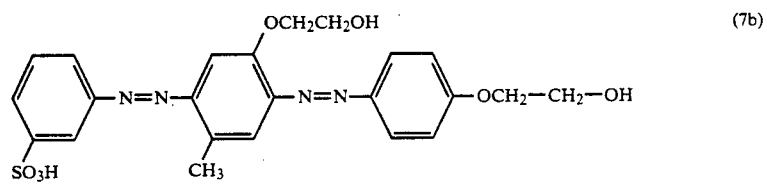
(7b)
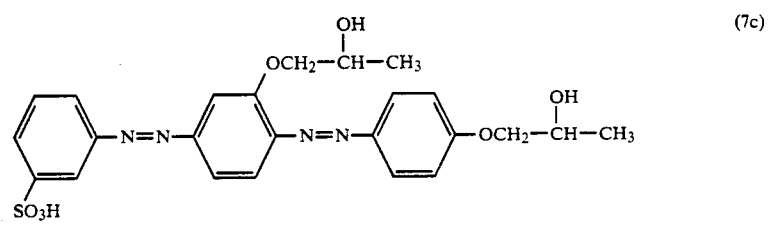
(7c)
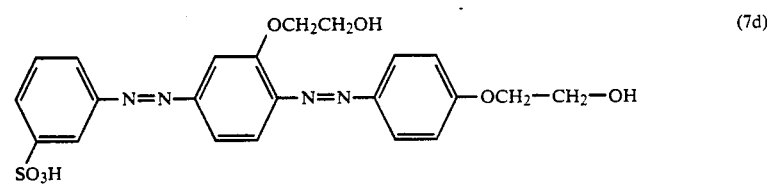
(7d)
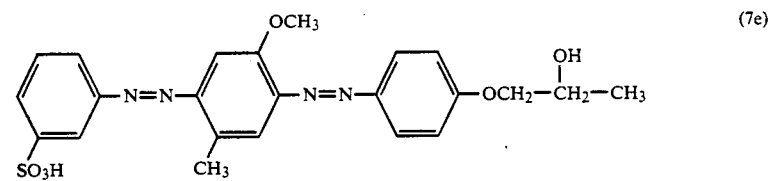
(7e)
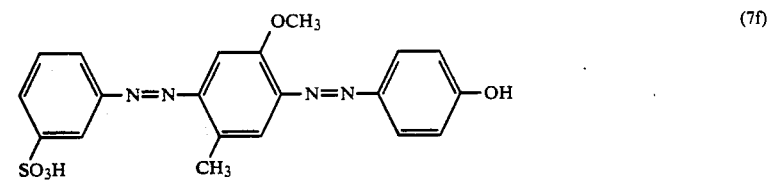
(7f)
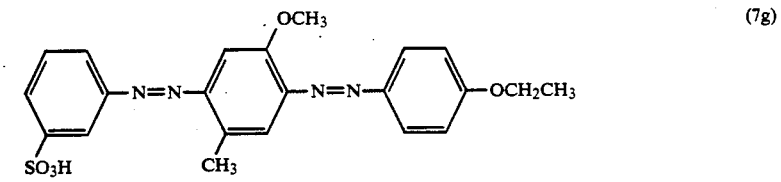
(7g)
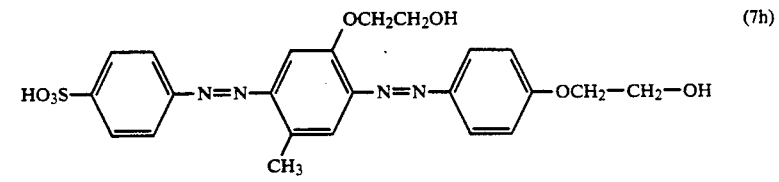
(7h)

-continued
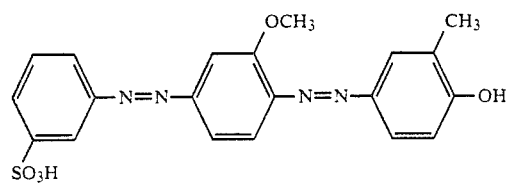 (7i)
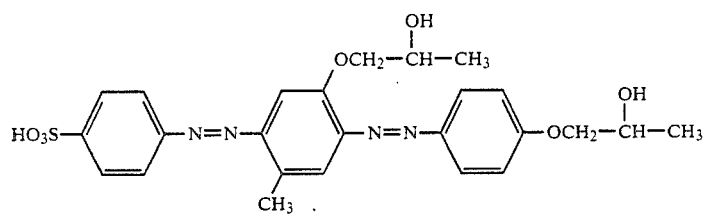 (7j)
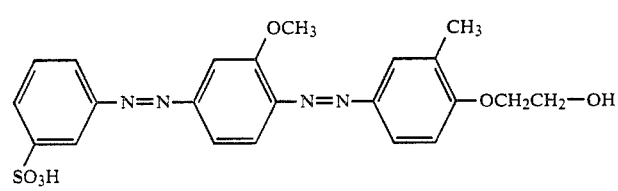 (7k)
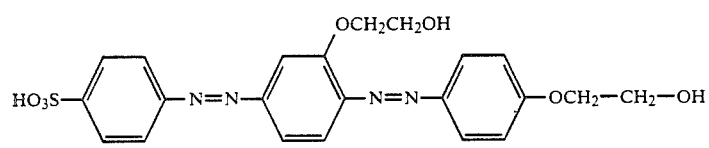 (7l)
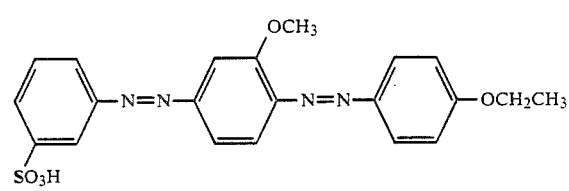 (7m)
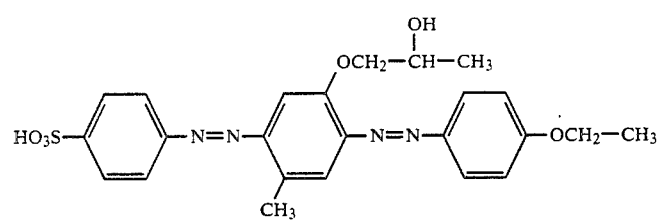 (7n)
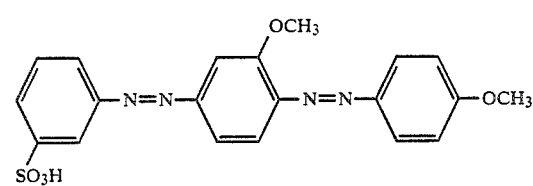 (7o)
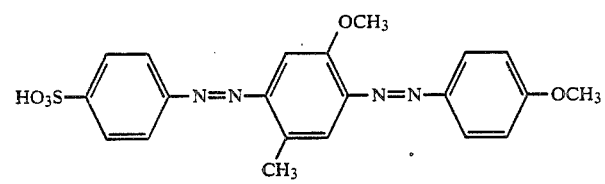 (7p)
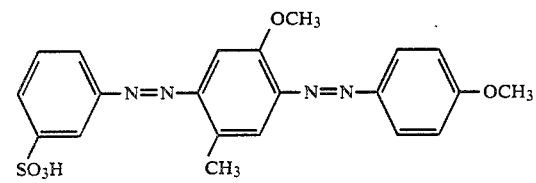 (7q)

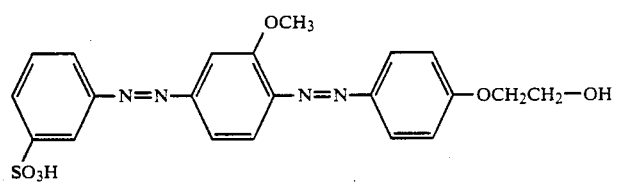  (7r)
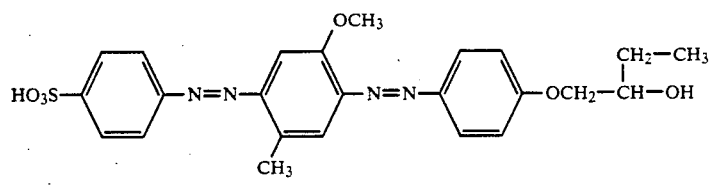  (7s)
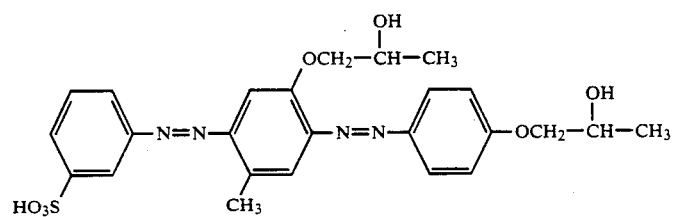  (7t)
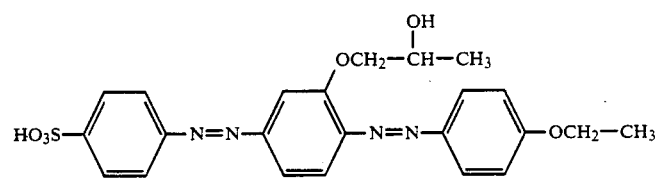  (7u)
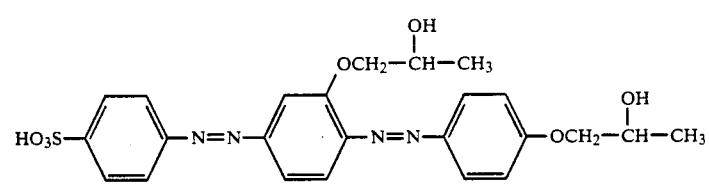  (7v)
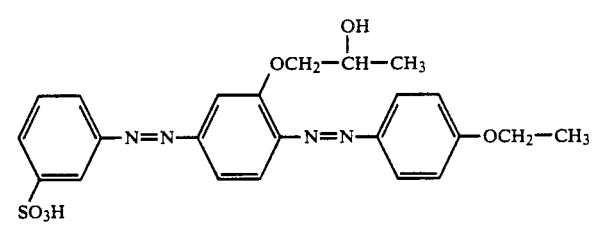  (7w)
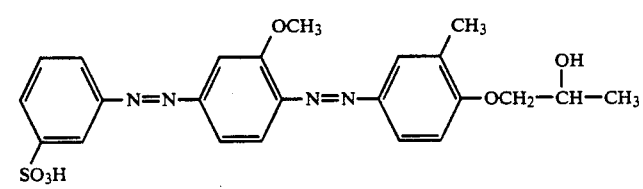  (7x)
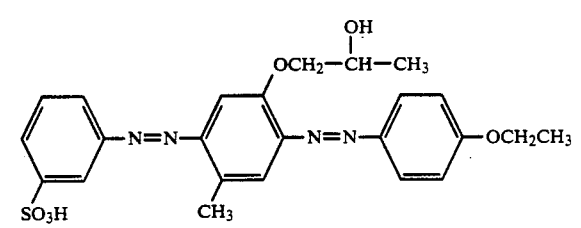  (7y)
and a dye of the formula (6).

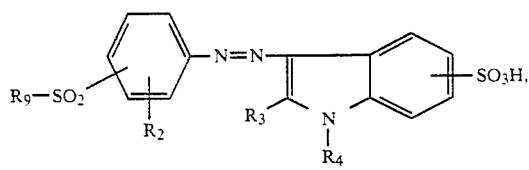
(13)

in which $R_2$, $R_3$ and $R_4$ are as defined under formula (4) and $R_9$ is a phenyl radical which is unsubstituted or substituted by $C_{1-4}$alkyl or halogen, or naphthyl.

6. A dye mixture according to claim 3, containing a dye of the formula (6) and at least one dye of the formulae (8), (9), (10) and (11)

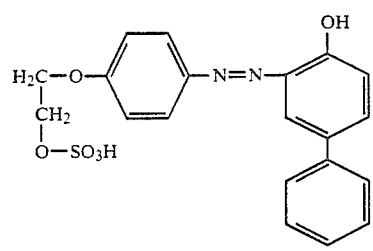
(8)

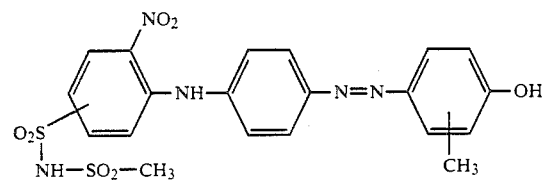
(9)

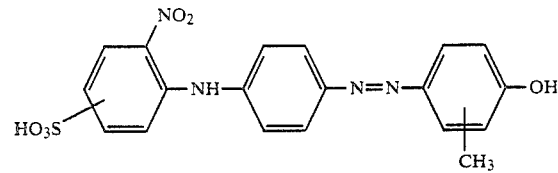
(10)

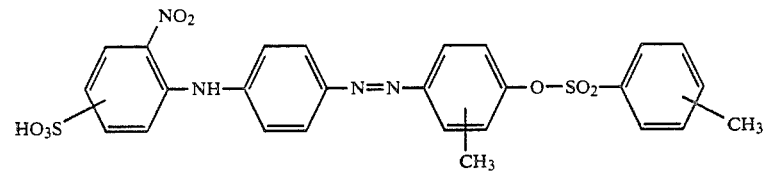
(11)

7. A dye mixture according to claim 3, containing a dye of the formula (6) and a dye of the formula

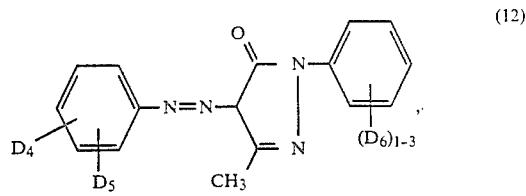
(12)

in which $D_4$ is chlorine or phenylaminosulfonyl, $D_5$ is hydrogen or sulfo and $(D_6)_{1-3}$ is 1 to 3 substituents $D_6$, and $D_6$ is hydrogen, chlorine or sulfo.

8. A dye mixture according to claim 7, which contains, as the dye of the formula (12), one of the dyes of the formulae (12a) to (12d)

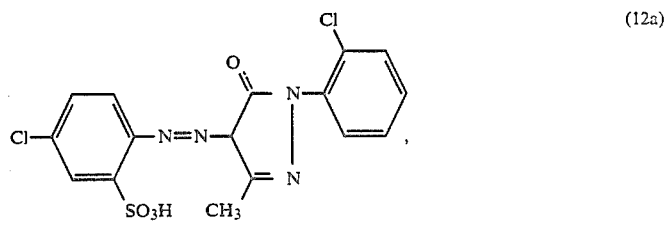
(12a)

(12b)
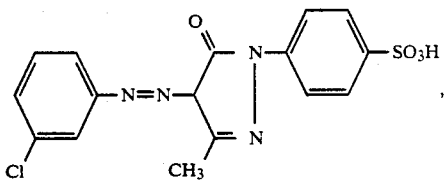

(12c)
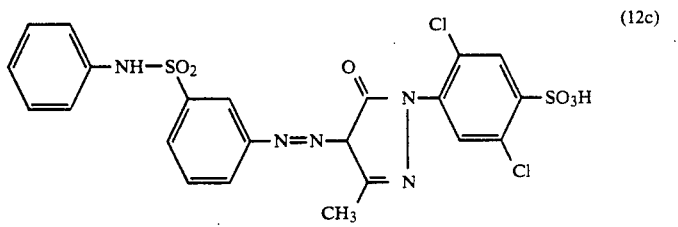

or

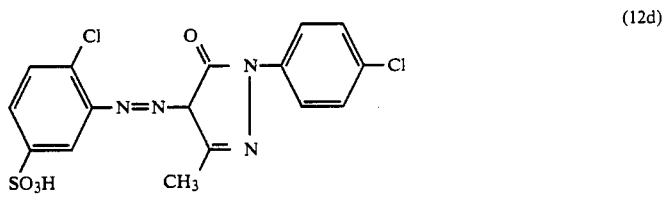

(12d)

9. A dye mixture according to claim 4, which contains, as the dye of the formula (6), a dye of the formula

(13)
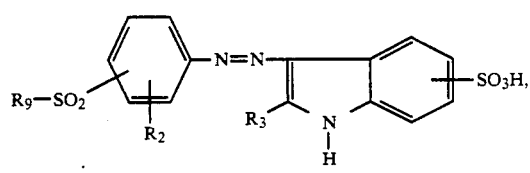

in which $R_2$, $R_3$ and $R_4$ are as defined under formula (6) and $R_9$ is a phenyl radical which is unsubstituted or substituted by $C_{1-4}$alkyl or halogen, or naphthyl, and a dye of the formula (7).

10. A dye mixture of claim 9 wherein $R_2$ is hydrogen, $R_3$ is phenyl, $R_4$ is hydrogen and $R_9$ is phenyl.

11. A dye mixture according to claim 9, which is a dye mixture containing the dye of the formula

(14)
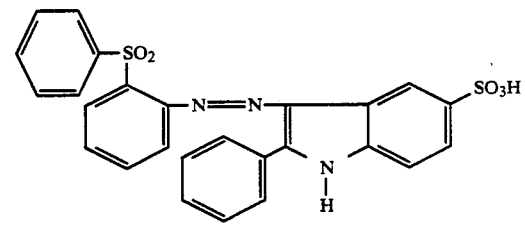

and the dye of the formula (7o)
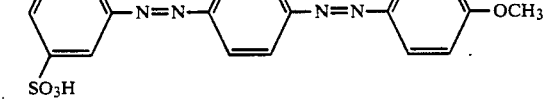

or the dye of the formula (7p)
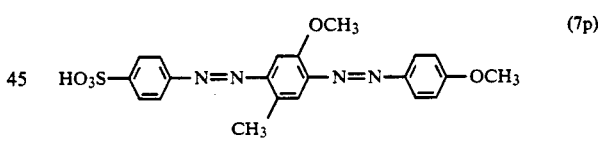

12. A dye mixture according to claim 6, which contains, as the dye of the formula (6), a dye of the formula

(13)
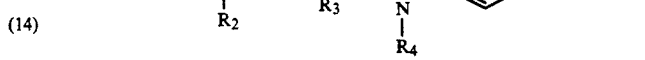

in which $R_2$, $R_3$ and $R_4$ are as defined under formula (6) and $R_9$ is a phenyl radical which is unsubstituted or substituted by $C_{1-4}$alkyl and halogen, or naphthyl, and a dye of the formula (8), (9), (10) or (11).

13. A dye mixture of claim 12 wherein $R_2$ is hydrogen, $R_3$ is phenyl, $R_4$ is hydrogen and $R_9$ is phenyl.

14. A dye mixture according to claim 12, which is a dye mixture containing the dye of the formula

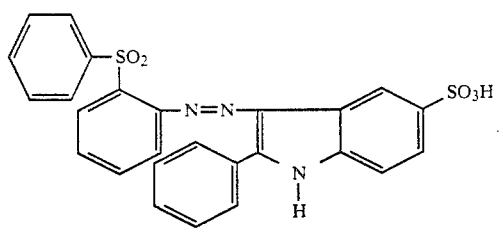

and the dye of the formula

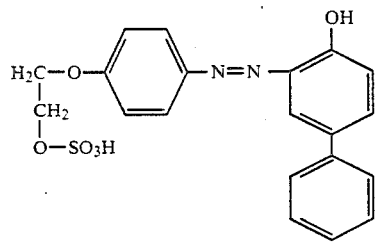

or

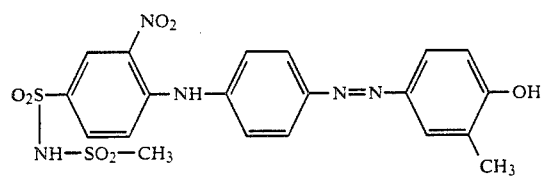

or

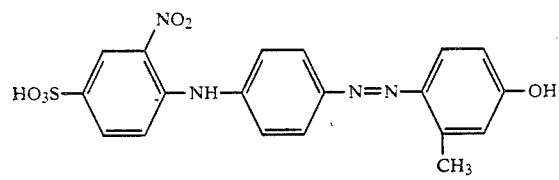

or

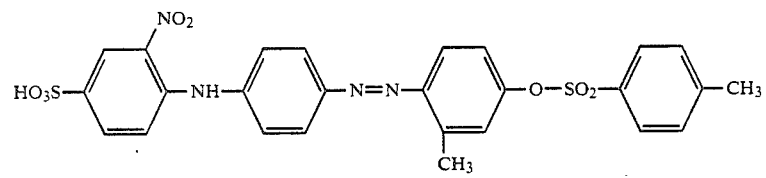

15. A dye mixture according to claim 1, wherein the dyes of the formulae (1) and (2) or (1) and (3) or (1) and (4) or (1) and (12) are present in a ratio of from 20:80 to 80:20.

16. A dye mixture of claim 15 wherein the ratio of the dyes is 40:60 to 60:40.

17. A dye mixture according to claim 1, containing a dye of the formula (6) and at least one dye of the formula

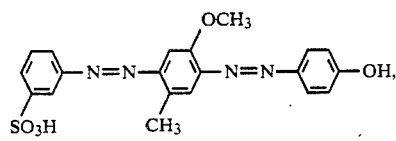  (7f)

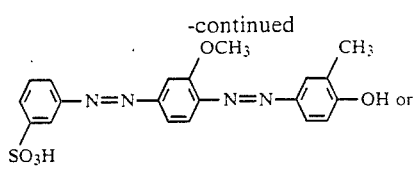  (7i)

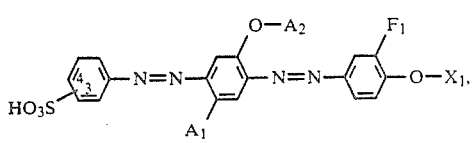  (7)

in which $A_1$ is hydrogen or methyl, $F_1$ is hydrogen or methyl, $A_2$ and $X_1$ independently of one another are methyl, ethyl, $\beta$-hydroxyethyl, $\beta$-hydroxypropyl, $\beta$-hydroxybutyl or $\alpha$-ethyl-$\beta$-hydroxyethyl and the sulfo group is bonded in the 3- or 4-position.

18. A process for dyeing or printing a naturally occurring or synthetic polyamide material which comprises applying a tinctorally effective amount of a dye mixture according to claim 15 to the polyamide material.

19. A process for dyeing or printing a naturally occurring or synthetic polyamide material which comprises applying, to the polyamide material, a tinctorally effective amount of a trichromatic mixture of dyes, said trichromatic mixture comprising a dye mixture according to claim 15 in combination with a red dye and a blue dye.

20. A dyeing or printing preparation comprising a dye mixture according to claim 15.

* * * * *